United States Patent [19]

Churchill et al.

[11] Patent Number: 4,854,192
[45] Date of Patent: Aug. 8, 1989

[54] CENTRIFUGALLY CONTROLLED TWO-SPEED ACCESSORY DRIVE

[75] Inventors: Bruce A. Churchill, Ithaca, N.Y.; Jeffery D. Raugh, Grosse Ile, Mich.

[73] Assignee: Borg-Warner Automotive, Inc., Troy, Mich.

[21] Appl. No.: 124,532

[22] Filed: Nov. 18, 1987

[51] Int. Cl.$^4$ .................. F16H 3/70; F16H 57/10
[52] U.S. Cl. .................. 74/752 E; 74/752 F; 74/785
[58] Field of Search ............ 74/763, 762, 785, 752 E, 74/752 F; 192/105 CS, 105 C, 103 A

[56] References Cited

U.S. PATENT DOCUMENTS

| | | | |
|---|---|---|---|
| 2,005,167 | 6/1935 | Roeder | 74/752 E |
| 2,064,450 | 12/1936 | Spase | 192/105 C |
| 2,524,311 | 10/1950 | Fieux | 192/70.18 |
| 2,882,757 | 4/1959 | Edsall | 74/785 X |
| 2,943,517 | 7/1960 | Markley et al. | 74/785 X |
| 3,037,600 | 6/1962 | Heckethorn | 192/45.1 |
| 3,747,731 | 7/1973 | Smirl | 192/104 R |
| 3,772,940 | 11/1973 | Ohtsuka et al. | 74/785 |
| 3,797,331 | 3/1974 | Kjeldsteen | 74/752 E |
| 4,020,711 | 5/1977 | Woollard | 74/230.17 E |
| 4,036,331 | 7/1977 | Hayashi et al. | 74/752 E X |
| 4,080,843 | 3/1978 | Underwood | 74/336 R |
| 4,265,135 | 5/1981 | Smirl | 74/336 B |
| 4,412,460 | 11/1983 | Barthelemy | 74/752 E |
| 4,450,735 | 5/1984 | Koivunen et al. | 74/752 E X |
| 4,502,345 | 3/1985 | Butterfield | 74/336 B |
| 4,615,227 | 10/1986 | Stockton | 74/752 A X |
| 4,667,537 | 5/1987 | Sivalingham | 74/752 E |
| 4,679,456 | 7/1987 | Kaneyuki | 74/752 D |
| 4,706,520 | 11/1987 | Sivalingam | 74/781 R |

FOREIGN PATENT DOCUMENTS 0038968 4/1981 European Pat. Off. .............. 74/785
60-234157 11/1985 Japan ................................. 74/785

OTHER PUBLICATIONS

Froslie, L. E. et al., "Automatic Transmission Friction Elements." in *Design Practices-Passenger Car Automatic Transmissions-Part I.* (New York, Society of Automotive Engineers, Inc., 1962), pp. 81-90.

*Primary Examiner*—Dwight G. Diehl
*Attorney, Agent, or Firm*—Robert L. Zieg; James J. Jennings; James A. Geppert

[57] ABSTRACT

A centrifugally controlled two-speed accessory drive for operation of one or more automotive vehicle accessories to provide a two-stage operation depending on the engine speed, the drive including a gear box secured to the face of the accessory and having an input shaft driven by a pulley and belt from the engine, an output shaft driving the accessory, and a planetary gear set connecting the shafts. The gear set includes a sun gear connected to the output shaft, a ring gear rotatably mounted in the gear box and a planet carrier rotatable with the input shaft and mounting a plurality of planetary gears between the sun gear and ring gear. A cone clutch engages the ring gear to ground it through a Belleville spring, piston and fulcrum, and centrifugal weights act to unground the ring gear; a one-way clutch between the shafts allows the output shaft to overrun the input shaft when the ring gear is grounded nd rotate the output shaft with the input shaft as a unit when the ring gear is ungrounded.

12 Claims, 2 Drawing Sheets

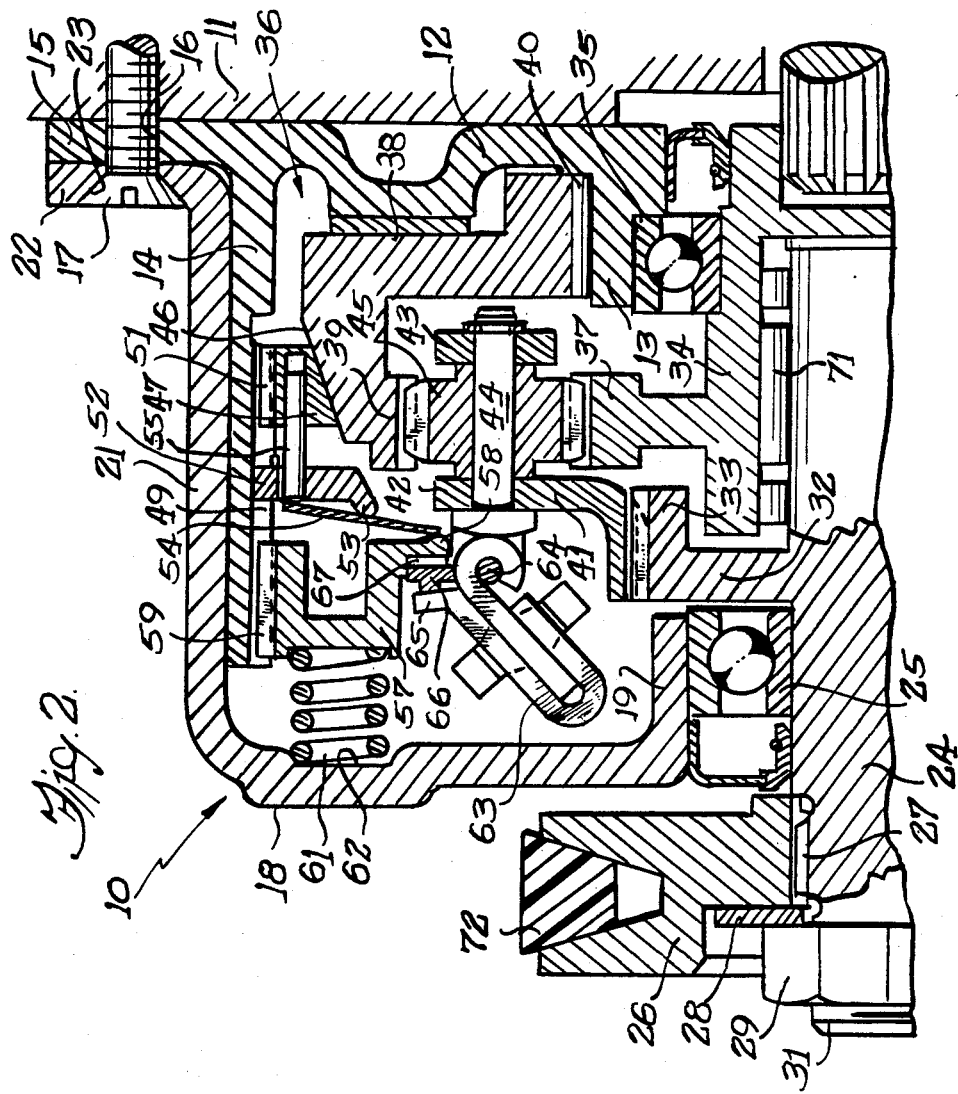

CENTRIFUGALLY CONTROLLED TWO-SPEED ACCESSORY DRIVE

BACKGROUND OF THE INVENTION

In designing automobile accessories, such as alternators, several factors must be considered. In the case of an alternator, there must be a compromise between acceptable speeds for the alternator and the desired alternator output. Tests show that the alternator output current drops drastically when the alternator speed falls below 3,000 rpm. On the other hand, the alternator output current rises only slightly when the alternator speed exceeds 10,000 rpm. Under ideal conditions, an alternator would operate at a continual speed change dependent on the required alternator output. Present alternator operation, however, relies on a standard fixed belt pulley ratio from the crankshaft of the engine to the alternator input pulley, thus alternator speed changes with engine speed. This ratio is determined by the required minimum alternator output current and the minimum engine idle speed. While this method may work well at lower engine speeds, higher engine speeds cause excessive alternator speeds; consequently, alternator design becomes very difficult. Predicted future trends show that alternator loads will increase dramatically and, in some instances, this is already a problem.

Possible solutions to this problem include (1) increasing the pulley ratio; (2) increasing the engine idle speed; (3) adding another alternator; and (4) developing a multi-speed alternator drive unit. All of these solutions have certain disadvantages affecting the vehicle's drivability and performance, however, a two-speed drive unit could be developed that would be cost effective and easily packaged. The present invention relates to a two-speed accessory drive unit to address this problem.

SUMMARY OF THE INVENTION

The present invention relates to a device that is mounted on an automotive alternator or other accessory to provide a speed change to its input. This allows the alternator to operate at its most efficient speed range, thus allowing a downsizing of the alternator and/or increase in alternator capacity. This device is a centrifugally operated two-speed drive unit used to control the speed of a rotating body within a certain range. More specifically, this is a device used to control an automotive alternator within the limits of 3600 rpm and 15,000 rpm (4.2 to 1 range) while the engine speed ranges from 600 to 6,000 rpm (10 to 1 range). The first speed range for the device is termed "high ratio" and has a speed increase of 2.4 to 1. This speed is used for low engine speeds (600 to 1200 rpm) in order to increase the speed of the alternator by a ratio of 6 to 1. This is accomplished by a 2.5 to 1 increase through the belt and pulleys and a 2.4 to 1 increase in the device resulting in a speed 6 times input speed, to allow the 3600 rpm goal. The second speed termed "low ratio" has a speed increase of 1 to 1. This ratio is used during medium to high engine speed (1200 to 6,000 rpm) to accomplish an overall ratio increase of 2.5 to 1 in order to limit maximum alternator speed to the 15,000 rpm goal.

The present invention also relates to a two-speed alternator drive utilizing a conventional planetary gear set having the input through the planet gears and planet carrier and the output through a sun gear mounted on the output shaft. A rotatable ring gear of the planetary gear set is controlled by a Belleville spring which grounds the ring gear by means of a cone clutch that is splined to the stationary housing. The planet carrier, which is mounted on the input shaft, and the sun gear are spinning on the same axis and the relative speed between the two are compensated for by a roller bearing/overrunning clutch assembly mounted between the two shafts to allow the sun/output shaft to spin faster than the input shaft/planet carrier. The "low ratio" is produced by ungrounding the ring gear and allowing it to spin. When this happens, the overrunning clutch takes over the load and will not allow the output shaft to spin slower than the input shaft.

The present invention further relates to a two-speed alternator drive utilizing a planetary gear set with a clutch-controlled ring gear. The ring gear is grounded by a Belleville spring and three compression springs acting on a piston utilized to preload the Belleville spring to a point where it retains the clutch engaged in the absence of an ungrounding force. The ungrounding of the ring gear to provide the low ratio stage is accomplished by reversing the effective thrust of the Belleville spring. As the speed of the input increases, weights arranged radially along the planet carrier increase in centrifugal force. This increases the load in an axial direction by means of a pivot transferring the load to the piston through a washer and thrust bearing, thus allowing the rotating body to transfer the load to a non-rotating axially movable piston. This piston carries the axial force from the weights and applies it to the Belleville spring. As the axial force approaches a critical limit (corresponding to 1200 engine rpm), the Belleville spring flexes and contacts a fulcrum point which is grounded to the stationary case. This transfers the load from the cone clutch to the fulcrum carrier and releases the cone clutch allowing the ring gear to spin freely.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWING

FIG. 2 is an enlarged partial cross sectional view of the device of FIG. 1, but showing the drive in the engaged - high ratio condition.

DESCRIPTION OF THE PREFERRED EMBODIMENT

Figure 1:
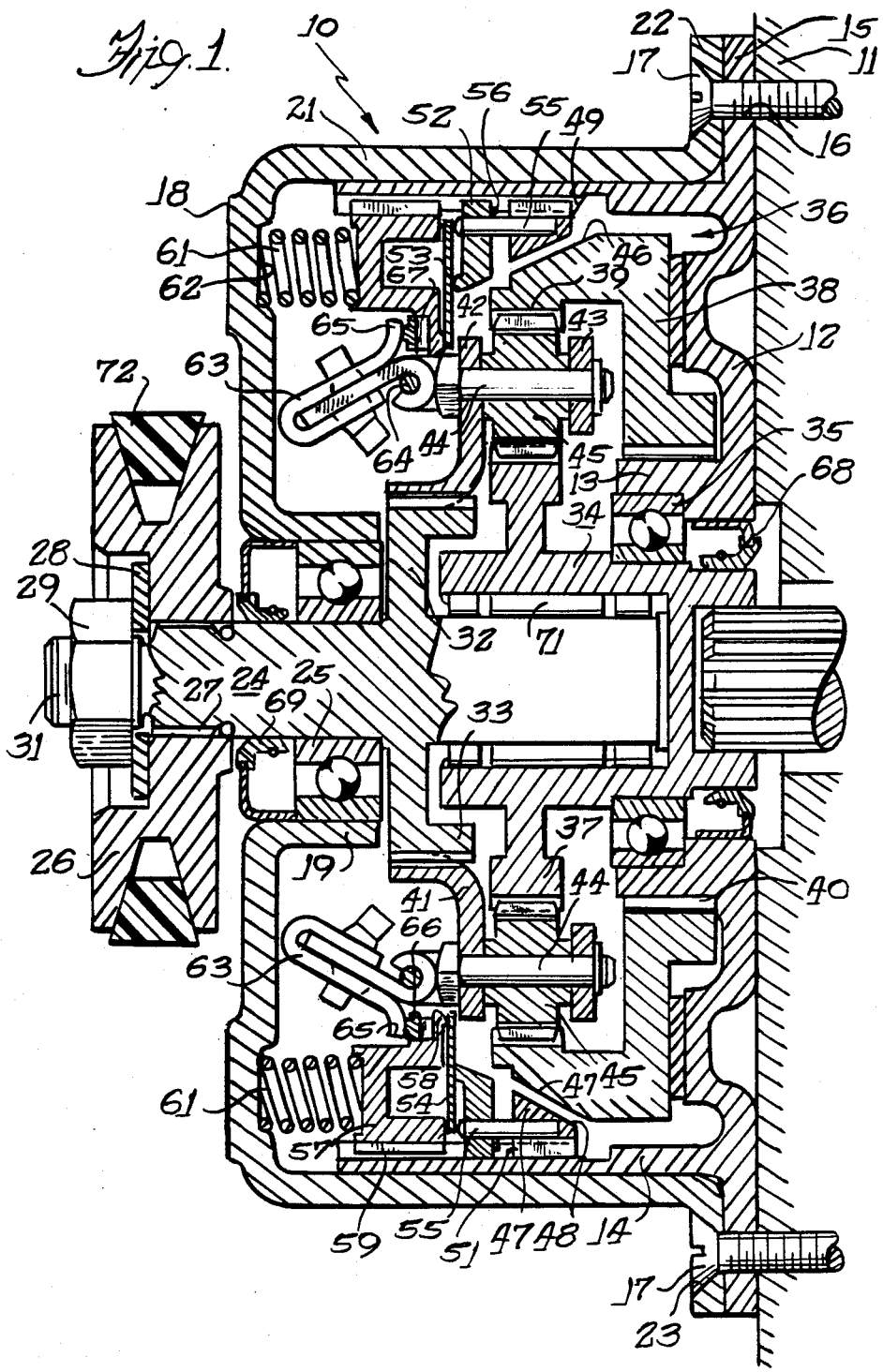
FIG. 1 is a cross sectional view through the two-speed accessory drive of the present invention mounted on the end of an automobile alternator showing the drive in disengaged - low ratio position.

Referring more particularly to the disclosure in the drawings wherein is shown an illustrative embodiment of the present invention, FIG. 1 discloses a two-speed gear box 10 that is appropriately mounted onto the end of an accessory 11, such as an alternator for an automotive vehicle engine. This gear box is formed of a back plate 12 having an inner annular flange 13 defining a central opening, an axially extending outer annular flange 14, and an outer radially extending mounting flange 15 having openings 16 to receive suitable mounting means, such as mounting bolts 17, supporting the plate on the accessory. A cup-shaped housing 18 includes an inner annular axial flange 19 defining a central opening, and an outer annular axially extending flange or side wall 21 which terminates in a radial mounting flange 22 having openings 23 therein to receive the mounting bolts 17 securing the mounting flanges together in abutting relation and securing the gear box onto the accessory unit.

An input shaft 24 extends into the gear box 10 through a bearing 25 mounted within the opening defined by the inner axial flange 19 and terminates adjacent the back plate 12. At the forward end of the input shaft, a drive pulley 26 is secured to the input shaft by a splined connection 27, the pulley receiving a thrust washer 28 and a nut 29 threadingly engaging the threaded end 31 of the input shaft. A radial flange 32 integral with the input shaft terminates in a splined connection 33 cooperating with a planetary gear set 36. An output sleeve shaft 34 is mounted in a bearing 35 received in the opening defined by flange 13 in the back plate 12 and encompasses the back end of the input shaft 24. This shaft includes an integral sun gear 37 utilized in the planetary gear set 36 and either projects into the accessory unit or receives the end of a rotary shaft housed in the accessory unit.

An annular ring gear body 38 is rotatably mounted by needle bearings 40 on the inner flange 13 of the back plate 12 and has a forwardly extending ring gear 39 adjacent the annular outer flange 14 of the back plate. A planet carrier 41 is connected to the input shaft through splined connection 33, the carrier including a radial flange 42 on one side of the sun gear 37 and an annular member 43 positioned on the opposite side of the sun gear; a plurality of shafts 44 projecting through both the radial flange 42 and the annular member 43 and serving as axes for the planet gears 45 meshing with the sun gear 37 and the ring gear 39.

The exterior surface of the ring gear adjacent the annular flange 14 is provided with a conical clutch surface 46 adapted to be engaged by a complementary clutch surface 48 on an annular cone clutch 47. The interior surface of the annular flange 14 is provided with a plurality of axially extending splines 49 which engage with complementary exterior splines 51 on the cone clutch 47. An annular ring 52 grounded to the annular flange 14 by the splines is provided with a fulcrum point 53 cooperating with a Belleville spring 54 having its outer edge contacting a series of axially extending pins 55 secured in the cone clutch and projecting through openings formed in the annular ring 52. A snap ring 56 in the splined surface retains the annular ring in an axially fixed position. The inner edge of the Belleville spring 54 engages a fulcrum ridge 58 of an axially movable piston 57 having exterior splines 59 cooperating with the splines 49. The piston is axially biased towards the annular ring 52 by means of a plurality of compression springs 61 received in seats 62 formed in the housing 18.

A plurality of centrifugal weights 63 are arranged radially along the planet carrier 41 and mounted thereon by pivots 64. Each weight includes an outwardly bent arm or tab 65 which engages an annular washer 66 and thrust bearing 67 on the piston 57. The centrifugal weights 63 act to increase the load in an axial direction by means of the pivot 64 to transfer the load to the piston 57, thus allowing the rotating body 41 to transfer a load to a non-rotating axially movable piston. This piston carries the axial force from the weights and applies it to the Belleville spring to allow disengagement of the cone clutch 47. The openings defined by the inner flange 13 of the back plate 12 and the inner flange 19 of the housing 18 are provided with resilient sealing means 68 and 69, respectively, to prevent dust from entering the housing 18 and to prevent the egress of lubricant from the housing to the exterior. Also, a roller bearing/overrunning clutch assembly 71 is provided between the two shafts which allows the sun/output shaft 34 to spin faster than the input shaft 24 and planet carrier 41 in high ratio and resists the sun/output shaft from spinning slower than the input shaft in low ratio.

A suitable drive belt 72 rotates the pulley 26 from a drive shaft of the engine (not shown) to rotate the input shaft 24. The first speed termed "high ratio" has a speed increase of 2.4 to 1. This speed is used during low engine speed (600 to 1200 rpm) in order to increase the speed of the alternator by 6 to 1. This is accomplished by a 2.5 to 1 increase through the pulleys and a 2.4 to 1 increase in the device resulting in a product of six times speed input, to allow the 3600 rpm goal. Thus, when the engine is at idling speed of 600 rpm, the alternator or other accessory is rotating at a speed of 3600 rpm. While the engine is idling, the Belleville spring 54 through the pins 55 axially urges the cone clutch 47 into engagement with the conical clutch surface 46 on the ring gear 39, thus grounding the ring gear to the non-rotating housing 18 (FIG. 2).

Rotation of the drive shaft 24 and the planet carrier 41 through the splined connection 33 causes rotation of the sun gear 37 and the output shaft 34. As the ring gear is grounded, the planetary gear set 36 causes a 2.4 to 1 increase in rotation of the device and the relative speed between the two shafts are compensated for by the overrunning clutch 71 mounted between the two shafts which allows the output shaft to spin faster than the input shaft. This "high ratio" speed arrangement will continue until the engine speed has reached 1200 rpm resulting in a rotation of the device of 7200 rpm for the alternator or other accessory.

The second speed termed "low ratio" has a speed increase of 1 to 1. This ratio is used during medium to high engine speeds (1200 to 6000 rpm) to accomplish an overall ratio increase of 2.5 to 1 in order to limit maximum alternator speed to 15,000 rpm. The "low ratio" is produced by ungrounding the ring gear 39 by reversing the effective thrust of the Belleville spring 54. As the input speed increases, the centrifugal weights 63 arranged radially along the planet carrier increase in centrifugal force. The weights rotate about the pivots 64 with the tabs 65 engaging the washer 66 of the piston 57 to urge the piston axially toward the ring gear. This axial movement of the piston causes the Belleville spring 54 to pivot about the fulcrum point 53 and release the cone clutch (FIG. 1). This transfers the load from the cone clutch 47 to the fulcrum carrier 52 releasing the cone clutch and allowing the ring gear 39 to spin freely, and allows the overrunning clutch assembly 71 to transfer torque from input shaft 24 to sleeve shaft 34. The compression springs 61 are utilized to preload the Belleville spring 54 to a point where it keeps the clutch engaged in the absence of movement from the centrifugal tabs, or at rest.

Several points of interest relate to this accessory drive unit as follows:

1. Critical shift points can be varied by changing the Belleville spring design.

2. A wide range of ratios are possible by varying the gear ratios in the planetary gear set.

3. A wide range of speeds can be accommodated by changing the weight of the centrifugal weights.

4. Planet speeds are relatively high, making this design most suitable for low speed applications or low speed increases.

We claim:

1. A two-speed gear box adapted to be mounted on the face of an accessory to be driven, comprising a housing, an input shaft in said housing operatively connected to a vehicle engine, an output shaft in said housing driving the accessory, a planetary gear train in said housing operatively connecting the input and output shafts and including a sun gear connected to said output shaft, a ring gear rotatably mounted in said housing and encompassing said output shaft, a plurality of planetary gears meshing with said sun gear and ring gear, a planet carrier for said planetary gears rotatable with said input shaft, an axially movable cone clutch mounted in said housing to ground said ring gear to alter the driving relationship between the input and output shafts, said ring gear having a conical clutch surface engaged by said cone clutch, a stationary annular fulcrum in said housing, and a Belleville spring in said housing having an inner edge and an outer edge, said outer edge operatively connected to said cone clutch, said annular fulcrum contacting a central portion of said Belleville spring.

2. A two-speed gear box as set forth in claim 1, including one-way clutch means between the input and output shafts to prevent overrunning of the input shaft relative to the output shaft in a low ratio mode of operation.

3. A two-speed gear box as set forth in claim 1, wherein said sun gear is integral with said output shaft, and a splined flange integral with said input shaft is connected to said planet carrier.

4. A two-speed gear box as set forth in claim 1, including a yieldably biased, axially movable annular piston in said housing engaging the inner edge of said Belleville spring.

5. A two-speed gear box as set forth in claim 4, wherein said cone clutch and said Belleville spring are on opposite sides of said fulcrum member, and a plurality of pins secured to said cone clutch project through said fulcrum to contact the outer edge of the Belleville spring.

6. A two-speed gear box as set forth in claim 5, wherein a plurality of compression springs urge said piston to engage and actuate said Belleville spring to retain said cone clutch in contact with the ring gear.

7. A two-speed gear box as set forth in claim 5, including a plurality of centrifugal weights pivotally mounted on said planet carrier and operatively connected to said Belleville spring for disengagement of said cone clutch.

8. A two-speed gear box as set forth in claim 7, including a washer and thrust bearing carried on said piston, each of said centrifugal weights having a tab engaging said washer, such that pivotal movement of said weights disengages said cone clutch.

9. A two-speed gear box as set forth in claim 8, including a one-way clutch between said input and output shafts to lock the shafts together when the cone clutch is disengaged.

10. A two-speed gear box adapted to be mounted on the face of an accessory to be driven, such as a vehicle alternator, comprising a housing, an input shaft in said housing operatively connected to a vehicle engine, an output shaft in said housing driving the accessory, a planetary gear train in said housing operatively connecting said shafts and including a sun gear on said output shaft, a ring gear rotatably mounted in said housing, a plurality of planetary gears meshing with said sun and ring gears, and a planet carrier rotatably mounting said planetary gears and rotatable with said input shaft, said output shaft terminating in a sleeve shaft portion within said housing, said input shaft terminating in an end received within said sleeve shaft, a one-way clutch located between said input shaft end and sleeve shaft, said ring gear having an external conical clutch surface, an axially movable cone clutch retained in said housing against rotation and having a conical clutch surface engageable with said ring gear, a stationary annular fulcrum in said housing having a fulcrum surface, a Belleville spring in said housing on the opposite side of the fulcrum from the cone clutch and having inner and outer peripheries and a central portion engaging the fulcrum surface, projections on said cone clutch extending through the fulcrum to engage the Belleville spring outer periphery, an axially movable piston having a fulcrum surface engaging the Belleville spring inner periphery, and means to urge the piston against the spring inner periphery to allow disengagement of said cone clutch and ring gear.

11. A two-speed gear box as set forth in claim 10, wherein said means to axially move the piston comprises a plurality of centrifugal weights pivotally mounted on said planet carrier and having tabs engaging said piston.

12. A two-speed gear box as set forth in claim 11, wherein said piston includes a washer and thrust ring engageable by said tabs.

* * * * *